United States Patent
Dang et al.

(10) Patent No.: US 12,479,748 B2
(45) Date of Patent: Nov. 25, 2025

(54) METHODS AND SYSTEMS FOR TREATING PHOSPHOGYPSUM-CONTAINING WATER

(71) Applicant: Evoqua Water Technologies LLC, Pittsburgh, PA (US)

(72) Inventors: Hao Dang, Dracut, MA (US); Wenxin Du, Dover, NH (US); George Y. Gu, Andover, MA (US); Michael J. Shaw, Derry, NH (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 377 days.

(21) Appl. No.: 17/276,369

(22) PCT Filed: Aug. 21, 2019

(86) PCT No.: PCT/US2019/047563
§ 371 (c)(1),
(2) Date: Apr. 23, 2021

(87) PCT Pub. No.: WO2020/041511
PCT Pub. Date: Feb. 27, 2020

(65) Prior Publication Data
US 2022/0073393 A1    Mar. 10, 2022

Related U.S. Application Data

(60) Provisional application No. 62/846,952, filed on May 13, 2019, provisional application No. 62/798,696, (Continued)

(51) Int. Cl.
*C02F 9/00* (2023.01)
*B01D 61/52* (2006.01)
(Continued)

(52) U.S. Cl.
CPC ............... *C02F 9/00* (2013.01); *B01D 61/52* (2013.01); *B01D 2311/04* (2013.01);
(Continued)

(58) Field of Classification Search
CPC ...... C02F 9/00; C02F 1/20; C02F 1/42; C02F 1/441; C02F 1/4693; C02F 1/5245;
(Continued)

(56) References Cited

U.S. PATENT DOCUMENTS

| | | |
|---|---|---|
| 4,392,959 A | 7/1983 | Coillet |
| 6,652,758 B2 | 11/2003 | Krulik |

(Continued)

FOREIGN PATENT DOCUMENTS

| | | |
|---|---|---|
| CN | 1880217 A | 12/2006 |
| CN | 102328984 A | 1/2012 |

(Continued)

OTHER PUBLICATIONS

Samad, Investigation Of The Radiological Impact On The Coastal Environment Surrounding A Fertilizer Plant, Journal of Environmental Radioactivity 133 (2014) 69-74 (Year: 2014).*

(Continued)

*Primary Examiner* — Claire A Norris

(57) ABSTRACT

Methods for processing pretreated phosphogypsum wastewater are disclosed. The pretreated wastewater may be subjected to electrodialysis involving at least one monovalent cation selective membrane. Further downstream membrane treatment may be applied. Upstream precipitation and air-stripping techniques may optionally also be employed. Related systems are also disclosed.

11 Claims, 8 Drawing Sheets

Related U.S. Application Data filed on Jan. 30, 2019, provisional application No. 62/770,470, filed on Nov. 21, 2018, provisional application No. 62/720,566, filed on Aug. 21, 2018.

(51) Int. Cl.
| | | |
|---|---|---|
| *C02F 1/20* | (2023.01) | |
| *C02F 1/42* | (2023.01) | |
| *C02F 1/44* | (2023.01) | |
| *C02F 1/469* | (2023.01) | |
| *C02F 1/52* | (2023.01) | |
| *C02F 1/66* | (2023.01) | |
| *C02F 101/10* | (2006.01) | |
| *C02F 101/14* | (2006.01) | |
| *C02F 101/16* | (2006.01) | |
| *C02F 103/34* | (2006.01) | |

(52) U.S. Cl.
CPC .............. *B01D 2311/2623* (2013.01); *B01D 2311/2642* (2013.01); *B01D 2311/2653* (2013.01); *C02F 1/20* (2013.01); *C02F 1/42* (2013.01); *C02F 1/441* (2013.01); *C02F 1/4693* (2013.01); *C02F 1/5245* (2013.01); *C02F 1/529* (2013.01); *C02F 1/66* (2013.01); *C02F 2101/105* (2013.01); *C02F 2101/14* (2013.01); *C02F 2101/16* (2013.01); *C02F 2103/34* (2013.01); *C02F 2209/02* (2013.01); *C02F 2209/055* (2013.01); *C02F 2209/06* (2013.01); *C02F 2209/40* (2013.01); *C02F 2301/046* (2013.01)

(58) Field of Classification Search
CPC ...... C02F 1/529; C02F 1/66; C02F 2101/105; C02F 2101/14; C02F 2101/16; C02F 2103/34; C02F 2209/02; C02F 2209/055; C02F 2209/06; C02F 2209/40; C02F 2301/046; C02F 5/02; C02F 2103/10; C02F 2301/08; B01D 61/52; B01D 2311/04; B01D 2311/2623; B01D 2311/2642; B01D 2311/2653; B01D 61/025; B01D 2311/06; B01D 2317/025; B01D 61/44; B01D 61/58
See application file for complete search history.

(56) References Cited

U.S. PATENT DOCUMENTS

| | | |
|---|---|---|
| 6,916,427 B2 | 7/2005 | Roth |
| 2009/0306451 A1 | 12/2009 | Cerea |
| 2011/0127223 A1* | 6/2011 | Astley ................ A23K 20/26 |
| | | 423/306 |
| 2011/0132839 A1 | 6/2011 | Zuback et al. |
| 2012/0070360 A1 | 3/2012 | Wissemborski et al. |
| 2013/0062289 A1 | 3/2013 | Cote et al. |
| 2014/0183045 A1 | 7/2014 | Fu et al. |
| 2014/0231359 A1 | 8/2014 | Cote et al. |
| 2015/0308001 A1 | 10/2015 | Barak |
| 2015/0368137 A1 | 12/2015 | Miller et al. |
| 2016/0002082 A1* | 1/2016 | Yin ................ C02F 1/4693 |
| | | 210/243 |
| 2016/0130164 A1 | 5/2016 | Whittier et al. |
| 2017/0113957 A1 | 4/2017 | Eckelberry |
| 2017/0362102 A1 | 12/2017 | Ganzi |
| 2022/0259085 A1 | 8/2022 | Dang et al. |
| 2023/0145108 A1 | 5/2023 | Du et al. |

FOREIGN PATENT DOCUMENTS

| | | | |
|---|---|---|---|
| CN | 106966467 A | 7/2017 | |
| CN | 107381892 A | 11/2017 | |
| KR | 100556686 B1 | 3/2006 | |
| WO | 2005118222 A2 | 12/2005 | |
| WO | 2007148954 A1 | 12/2007 | |
| WO | 2014136651 A1 | 9/2014 | |
| WO | 2015000462 A1 | 1/2015 | |
| WO | WO-2016201563 A1 * | 12/2016 | ............ B01D 61/44 |

OTHER PUBLICATIONS

Sadrzadeh, Sea water desalination using electrodialysis, Desalination 221 (2008) 440-447 (Year: 2008).*
Da Silva, Gilson, "Examination Report", Brazilian Patent Application No. BR112021003110-3, mailed May 16, 2023, 7 pages.
Perpich Jr, Bill, et al, Mobile Wastewater Treatment Helps Remediate Concentrated Acidic Process Water at Fertilizer Plant, Florida Water Resources Journal, Jul. 1, 2005, p. 26.
Da Silva, Gilson, "Search Report", Brazilian application No. 112021003131-6, mailed Feb. 1, 2023, 8 pages.
Shane, Thomas, "International Search Report & Written Opinion", International Patent Application No. PCT/US19/47563, mailed Nov. 13, 2019, 8 pages.
Baharlou, Simin, "International Preliminary Report of Patentability", International Patent Application No. PCT/US2019/047563, mailed Feb. 23, 2021, 1 page.
Issiouy et al, "Thermal treatment of moroccan phosphogypsum", Published by Chemical Department, Faculty of Sciences, Ibn Zohr University, B.P. 8106, Agadir 80000, Morocco, full text in foreign language with English Abstract, published Mar. 2013. (Year: 2013).
Khan, Konika, "Examination Report No. 1", Australian Patent Application No. 2019324164, mailed Apr. 2, 2024, 3 pages.
El-Ghafari, Rasha, "Requisition by the Examiner", Canadian Patent Application No. 3107787, mailed Jan. 10, 2025.

* cited by examiner

METHODS AND SYSTEMS FOR TREATING
PHOSPHOGYPSUM-CONTAINING WATER

CROSS-REFERENCE TO RELATED APPLICATIONS

This application claims priority to U.S. Provisional Patent Application Ser. No. 62/720,566 filed on Aug. 21, 2018 and titled "METHOD AND SYSTEM TO TREAT PHOSPHO-GYPSUM CONTAINING WASTEWATER," U.S. Provisional Patent Application Ser. No. 62/770,470 filed on Nov. 21, 2018 and titled "IMPROVED LIMING PROCESS OF ACIDIC WATER FOR PHOSPHATE RECOVERY AND SCALING REDUCTION FOR DOWNSTREAM PROCESSES," U.S. Provisional Patent Application Ser. No. 62/798,696 filed on Jan. 30, 2019 and titled "AMMONIA/AMMONIUM REDUCTION DURING INDUSTRIAL ACIDIC WASTEWATER TREATMENT," and U.S. Provisional Patent Application Ser. No. 62/846,952 filed on May 13, 2019 and titled "USING MONO-VALENT CATION SELECTIVE AND ANION ION EXCHANGE MEMBRANES IN ELECTRODIALYSIS TO TREAT DOUBLE LIME TREATED POND WATER," the entire disclosure of each of which is hereby incorporated herein by reference in its entirety for all purposes.

FIELD OF THE TECHNOLOGY

Aspects relate generally to water treatment and, more specifically, to the treatment of water containing phosphogypsum.

BACKGROUND

Phosphoric acid is a precursor compound in the manufacture of various common fertilizers. Phosphogypsum is a side product from the production of phosphoric acid by treating phosphate ore with sulfuric acid. The reaction produces phosphogypsum sludge, phosphoric acid, and a byproduct liquid stream. The byproduct stream is typically reused for cooling but ultimately stored in large open-air enclosures called phosphogypsum stacks or ponds.

This wastewater associated with and produced by phosphate manufacturing operations is typically acidic and typically contains various dissolved constituents such as fluoride, ammonia, silica, sulfate, calcium, heavy metals, phosphate, magnesium, colloidal matter, organic carbon, and, in some instances, radium (a radioactive element). The ponds associated with phosphate processing contain billions of gallons of this wastewater, e.g. 3 billion gallons each. Due to increasingly strict environmental regulations and annual rainfall, the stacks must be treated and closed by the operating companies. The pond water has become one of the largest liabilities of phosphoric acid producers. There is an urgent environmental need to treat this wastewater, particularly in environmentally sensitive areas, or areas where population growth has come into closer contact with phosphate processing sites. Treatment of this wastewater to reduce its toxicity and its volume has been a technological challenge of significant interest. The toxic or harmful contaminants must be either reduced or eliminated before treated water can be discharged into the environment.

SUMMARY

In accordance with one or more aspects, a method of treating phosphogypsum-containing water is disclosed. The method may comprise subjecting a pretreated supernatant to electrodialysis (ED) involving at least one monovalent cation selective membrane to produce treated water meeting at least one predetermined discharge requirement, and discharging the treated water.

In some aspects, the method may further comprise subjecting the treated water to further ED prior to discharge. The method may further comprise subjecting the treated water to reverse osmosis (RO) prior to discharge. The method may still further comprise polishing the treated water prior to discharge. In at least some aspects, polishing may involve ion exchange (IX) treatment.

In some aspects, the method may further comprise reducing a level of ammonia and/or ammonium in the pretreated supernatant prior to ED. For example, the pretreated supernatant may be subjected to air-stripping prior to ED.

In some aspects, the method may further comprise reducing a level of hardness in the pretreated supernatant prior to ED. For example, the pretreated supernatant may be subjected to precipitation prior to ED.

In some aspects, the at least one predetermined discharge requirement may pertain to a conductivity limit or a level of ammonia, fluoride, or phosphorous.

In some aspects, the pretreated supernatant is sourced from a double lime treatment (DLT) operation.

In some aspects, the method may further comprise returning at least one reject stream to a source of the phosphogypsum-containing water.

In some aspects, the method may further comprise measuring an ammonia concentration of the pretreated supernatant. The method may further comprise measuring a pH level of the pretreated supernatant.

In accordance with one or more aspects, a system for treating phosphogypsum-containing water is disclosed. The system may comprise a source of pretreated supernatant, an electrodialysis (ED) unit operation including at least one monovalent cation selective membrane, the ED unit operation configured to produce treated water meeting at least one predetermined discharge requirement, and a treated water outlet.

In some aspects, the system may further comprise a second ED unit operation fluidly connected downstream of the ED unit operation including at least one monovalent cation selective membrane. The second ED unit operation may not include a monovalent cation selective membrane.

In some aspects, the system may further comprise a RO unit operation fluidly connected downstream of the ED unit operation. The system may further comprise a polishing unit operation fluidly connected downstream of the ED unit operation. The system may further comprise a precipitation unit operation fluidly connected upstream of the ED unit operation. The system may further comprise an air-stripping unit operation fluidly connected upstream of the ED unit operation.

In some aspects, the system may further comprise at least one sensor configured to detect an operational parameter associated with the source of pretreated supernatant, the ED unit operation, or the treated water outlet. The sensor may be a flow rate, pH, temperature, conductivity, hardness, or concentration, e.g. ammonia concentration, sensor.

In some aspects, the system may further comprise a controller in communication with the at least one sensor. The controller may be configured to adjust a flow rate or PH level in response to input from the sensor.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
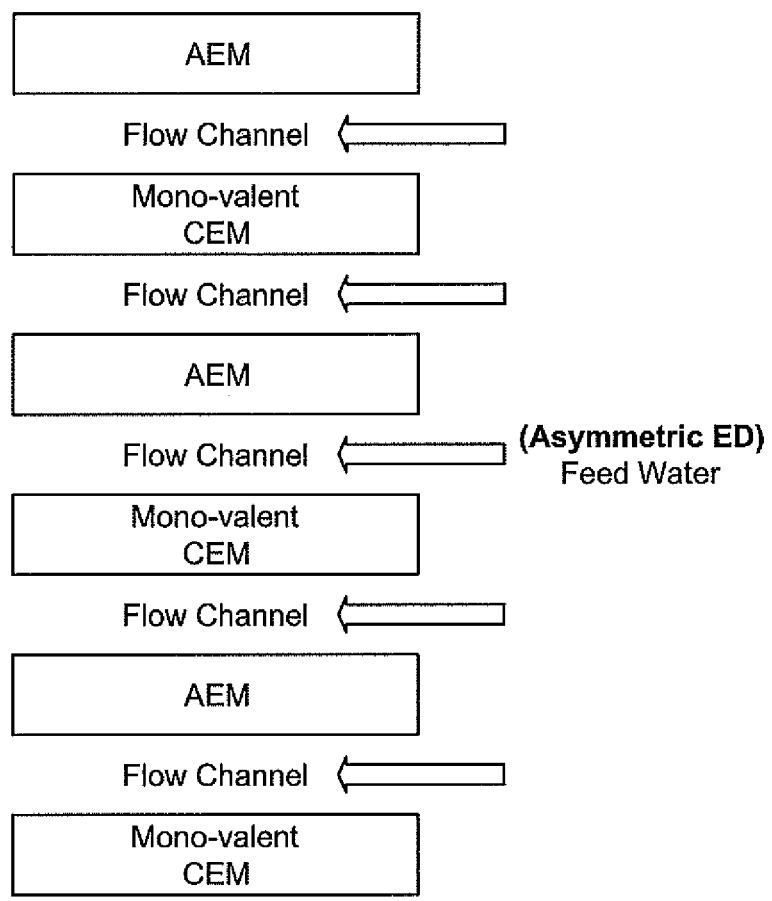
FIG. 1 presents a schematic of asymmetric electrodialysis in accordance with one or more embodiments.

In accordance with one or more embodiments, water containing phosphogypsum may be efficiently brought to within preestablished environmental discharge limits. As used herein, the term phosphogypsum-containing water may interchangeably be referred to herein as wastewater or process water. In some embodiments, various product streams (i.e. calcium carbonate and/or ammonium sulfate) may beneficially be recovered in conjunction with the wastewater treatment. In at least some embodiments, a cost competitive alternative to conventional treatment methods is presented. In some embodiments, consumption of fresh water associated with environmental discharge may desirably be reduced. In at least some embodiments, there is no dilution prior to discharge.

In accordance with one or more embodiments, phosphogypsum wastewater may originate from a phosphate manufacturing operation and be stored in a pond or stack. The phosphogypsum wastewater may be highly acidic, i.e. having a pH level of about 1.5 to about 2 and environmentally hazardous. A non-limiting example of the typical chemical composition of pond water is presented in Table 1. Beyond what is presented, the ammonia concentration may range from a few hundred ppm up to a few thousand ppm.

TABLE 1

| Parameter* | Range |
|---|---|
| pH, Standard Units | 1.6-2.1 |
| Total Acidity, as $CaCO_3$ | 20,000-60,000 |
| Fluoride, as F | 4,000-12,000 |
| Phosphorus, as P | 4,000-9,000 |
| Silicon, as Si | 1,000-3,000 |
| Total Solids | 20,000-50,000 |
| Total Suspended Solids | 50-250 |
| Conductivity, umhos | 15,000-40,000 |
| Chlorides, as Cl | 50-500 |
| Sulfates, as $SO_4$ | 2,000-12,000 |
| Sodium, as Na | 50-3,000 |
| Calcium, as Ca | 50-1,500 |
| Magnesium, as Mg | 50-400 |
| Aluminum, as Al | 50-1,000 |
| Chrome, as Cr | 0.2-5.0 |
| Zinc, as Zn | 1.0-5.0 |
| Iron, as Fe | 100-250 |

TABLE 1-continued

| Parameter* | Range |
|---|---|
| Manganese, as Mn | 5-30 |
| $NH_3$—N, as N | 0-1,200 |
| Total Organic N, as N | 3-30 |
| Color, APHA units | 20-4,000 |

*All values expressed as mg/L unless otherwise noted.

One conventional approach that may be used to dispose of phosphogypsum wastewater is deep well injection. This process injects the wastewater deep underground between impermeable layers of rocks to avoid polluting fresh water supplies. Proper geology is required for deep well injection sites, and a permit must be obtained prior to injecting the process water underground. Further, phosphate is not recoverable from process water in a deep well injection process.

In accordance with one or more embodiments, wastewater containing phosphogypsum may be pretreated. In some embodiments, the wastewater may be pretreated via conventional double lime treatment (DLT). DLT, or double liming, is generally a process in which lime is added in two stages to promote the precipitation of various constituents, i.e. fluoride species in a first stage, and phosphate species in a second stage. Some constituents that can be found in water, such as fluoride and phosphate, tend to form soluble acids under acidic conditions. Limestone and lime may be used to neutralize and remove these total dissolved solids (TDS). DLT has emerged as a widely employed process for treating pond water in view of its volume and chemical complexity. Non-limiting examples of the typical composition of DLT (stage-2) supernatant is presented in Tables 2A and 2B.

TABLE 2A

| Parameter* | Process Cooling Pond Water | Stage II Supernatant |
|---|---|---|
| pH, Std. Units | 1.70 | 9.0 |
| Acidity, as $CaCO_3$ | 32,800 | — |
| Fluoride, as F | 6,600 | 12-20 |
| Total P | 4,000 | 1-13 |
| Total Suspended Solids | 69 | 15 |
| Chlorides, as Cl | 72 | 75 |
| Sulfates, as $SO_4$ | 6,200 | 2,709 |
| Sodium as Na | 896 | 800 |
| Calcium, as Ca | 77 | 375 |
| Magnesium, as Mg | 44 | 22 |
| Aluminum, as Al | 389 | <0.2 |
| Chrome, as Cr | 0.43 | <0.10 |
| Zinc, as Zn | 1.46 | <0.10 |
| Iron, as Fe | 263 | 0.10 |
| Manganese, as Mn | 7.9 | 0.03 |
| Boron, as B | 0.90 | 0.50 |
| Lead, as Pb | <0.10 | <0.10 |

*All values in mg/L unless otherwise noted.

TABLE 2B

| CATIONS | RESULT | UNITS | ANIONS | RESULT | UNITS |
|---|---|---|---|---|---|
| Calcium (Ca) | 705 | mg/l CaCO3 | Bicarb (HCO3) | <0.5 | mg/l CaCO3 |
| Magnesium (Mg) | 8.41 | mg/l CaCO3 | Carbonate (CO3) | 343.6 | mg/l CaCO3 |
| Sodium (Na) | 2290 | mg/l CaCO3 | Hydroxide (OH) | 1177.3 | mg/l CaCO3 |
| Potassium (K) | 250 | mg/l CaCO3 | Fluoride (F) | 22.1 | mg/l CaCO3 |
| Iron (Fe) | 0.098 | mg/l | Chloride (Cl) | 185 | mg/l CaCO3 |
| Manganese (Mn) | <0.010 | mg/l | Bromide (Br) | 3.59 | mg/l CaCO3 |
| Aluminum (Al) | <0.050 | mg/l | Nitrate (NO3) | 12.4 | mg/l CaCO3 |
| Barium (Ba) | <0.050 | mg/l | Phosphate (PO4) | <0.800 | mg/l CaCO3 |
| Strontium (Sr) | 0.187 | mg/l | Sulfate (SO4) | 3200 | mg/l CaCO3 |
| Copper (Cu) | <0.020 | mg/l | Silica (SiO2) | 104 | mg/l CaCO3 |
| Zinc (Zn) | <0.020 | mg/l | | | |

| OTHER PARAMETERS | RESULT | UNITS | | RESULT | UNITS |
|---|---|---|---|---|---|
| pH | 10.50 | | Total Hardness | 711.91 | mg/l CaCO3 |
| Turbidity | 16.5 | NTU | TOC (C) | 48.72 | mg/l |
| Conductivity | 6595 | uS/cm | Free (CO2) [1] | 0.1 | mg/l CaCO3 |

| ADDITIONAL TESTS | RESULT | UNITS |
|---|---|---|
| (In-field) pH | 10.7 | |
| Ammonia (NH3) | 1326.822 | mg/l CaCO3 |
| Colloidal Silica (SiO2) | <0.02 | mg/l CaCO3 |

[1] Derived from Alkalinity and pH.

While heavy metal and phosphate contents may be reasonably low in the DLT supernatant, ammonia, sulfate, and/or hardness levels may still be quite high. Notably, while conventional DLT reduces the level of various undesirable constituents including those associated with phosphogypsum, DLT does not sufficiently treat the wastewater so as to meet relevant discharge limits, such as those which may be established by local, state, federal, or private agencies. For example, the State of Florida has set a maximum conductivity limit of 1,275 µS/cm for National Pollutant Discharge Elimination System (NPDES) permitting. Currently, wastewater treated via DLT is diluted by up to five to ten times in order to meet conductivity, concentration, and/or load-based limits for ammonia, fluoride, phosphorous, or other constituents. The water consumed for dilution is typically fresh or treated water that could be used for other purposes. The dilution water may be relatively expensive treated water, such as reverse osmosis product water.

In accordance with one or more embodiments, pretreated phosphogypsum wastewater may be further processed to allow for its discharge. Any other process stream with similar chemical compositions, for example, another semi-treated acidic supernatant, may likewise be treated. In at least some embodiments, the phosphogypsum wastewater may have been pretreated via DLT. The further treatment may meet relevant discharge standards with respect to conductivity, ammonia, fluoride, and/or phosphorous levels. In some embodiments, the pretreated wastewater is not diluted for discharge. The treated water may also be suitable for one or more downstream uses, such as for irrigation or other potable use.

In accordance with one or more embodiments, chemical and/or physical techniques may be applied to process pretreated phosphogypsum wastewater in order to meet discharge or use requirements.

In accordance with one or more embodiments, pretreated phosphogypsum wastewater may be subjected to electrodialysis (ED). In at least some embodiments, an ED unit operation may include at least one monovalent cation selective membrane which may be referred to herein as asymmetric ED. The monovalent cation selective membrane is designed to reject multivalent cations and allow monovalent cations to pass through membranes.

In accordance with one or more embodiments, pretreated phosphogypsum wastewater may be re-carbonated and/or undergo precipitation prior to ED if the hardness level, e.g. calcium or magnesium concentration, is too high.

In accordance with one or more embodiments, ammonia/ammonium may also be removed, e.g. via air-stripping, prior to ED if their levels are too high.

In one non-limiting embodiment, DLT supernatant may be high in calcium content and can be reduced by re-carbonation or soda-ash treatment. Optional subsequent air-stripping can remove ammonia/ammonium to a great extent if present. It may also be possible to skip the re-carbonation or soda-ash treatment depending on the capability of air-stripping technology employed to reduce hardness levels in the solution.

In accordance with one or more embodiments, the asymmetric ED may be followed one or more further membrane treatment unit operations. In at least some embodiments, asymmetric ED may be followed by a normal or conventional ED process. Normal ED as used herein generally refers to electrodialysis that does not distinguish monovalent ions from multivalent ions, i.e. neither the cation nor anion exchange membrane is designed to preferentially remove any particular group(s) of ions.

Figure 2:
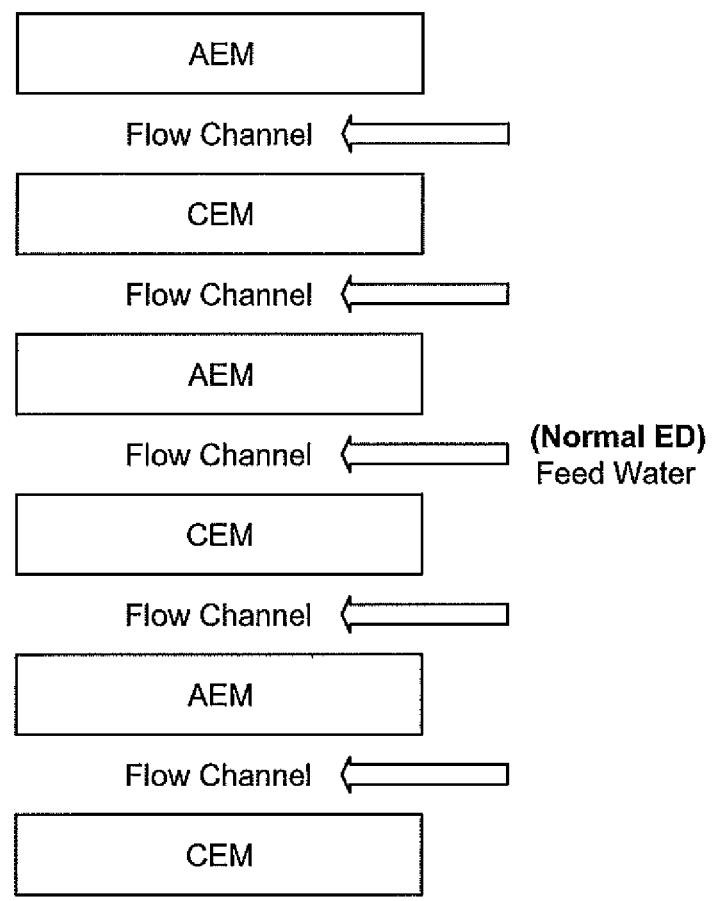
FIG. 2 presents a schematic of normal electrodialysis in accordance with one or more embodiments.

In the asymmetric ED (FIG. 1), the monovalent cation selective membrane and ordinary anion exchange membrane (AEM) may be employed to prevent potential scaling due to calcium and/or magnesium accumulation in the concentrate loop. The product stream from the asymmetric ED may then be fed to a normal ED (FIG. 2) to produce high quality product water that meets the NPDES permit requirement and is ready for direct discharge to the environment or reuse. The reject streams from both asymmetric ED and normal ED may be recycled to the pond water. Alternatively, it might be possible to store the reject streams, combined or separately, and enrich sodium sulfate using various technologies.

Pretreated phosphogypsum wastewater (e.g. DLT stage-2 effluent) may contain varying levels of ammonia/ammonium depending on the source of the pond water. Ammonia/ammonium levels may also be dependent on a pH level of the pretreated wastewater.

Figure 3:
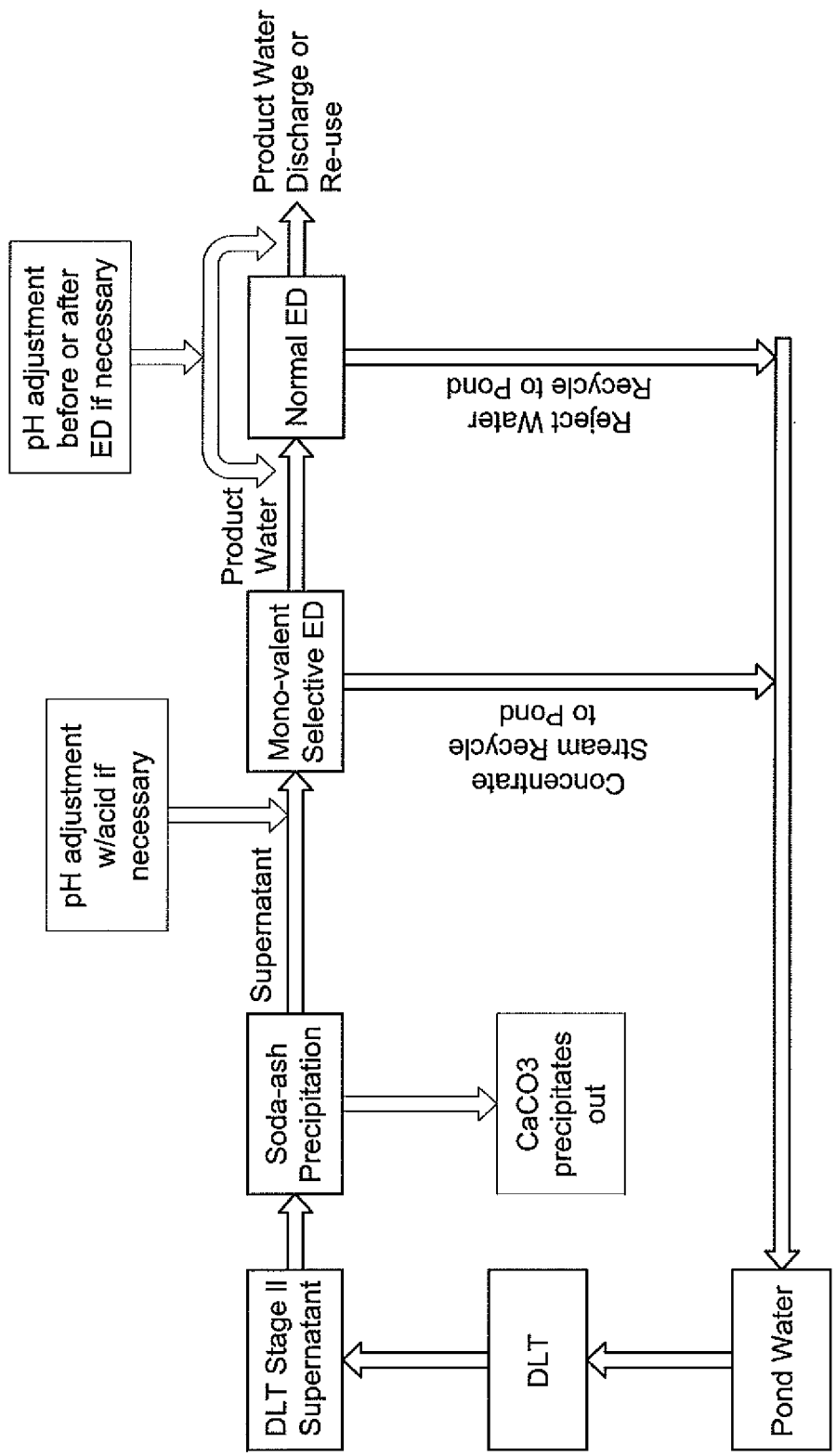
FIGS. 3-8 present process flow diagrams of water treatment systems including monovalent cation selective membrane electrodialysis in accordance with various non-limiting embodiments.

FIG. 3 shows one possible arrangement for treating the DLT effluent in which ideally ammonia/ammonium is not present or low in concentration (e.g. less than about 100 μm or less than about 50 ppm).

Figure 4:
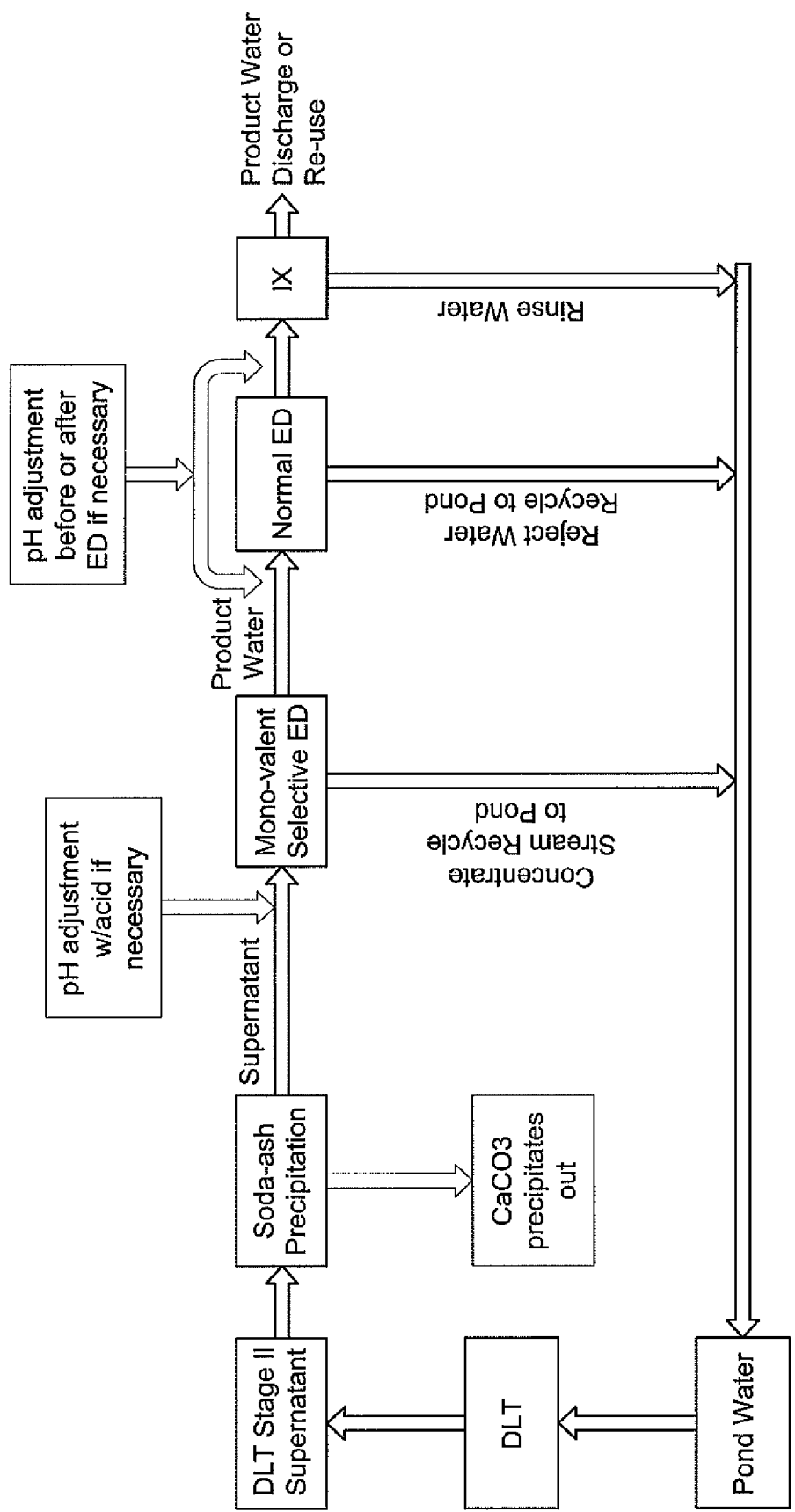

When the ammonia/ammonium concentration in the DLT II supernatant increases, e.g. to about 50 to about 200 ppm or so, it may require further polishing of the normal ED product water. Various effective unit operations known to those of skill in the relevant art may be implemented. For example, ion exchange (IX) may be used to meet the NPDES discharge requirements as depicted in FIG. 4.

Figure 5:
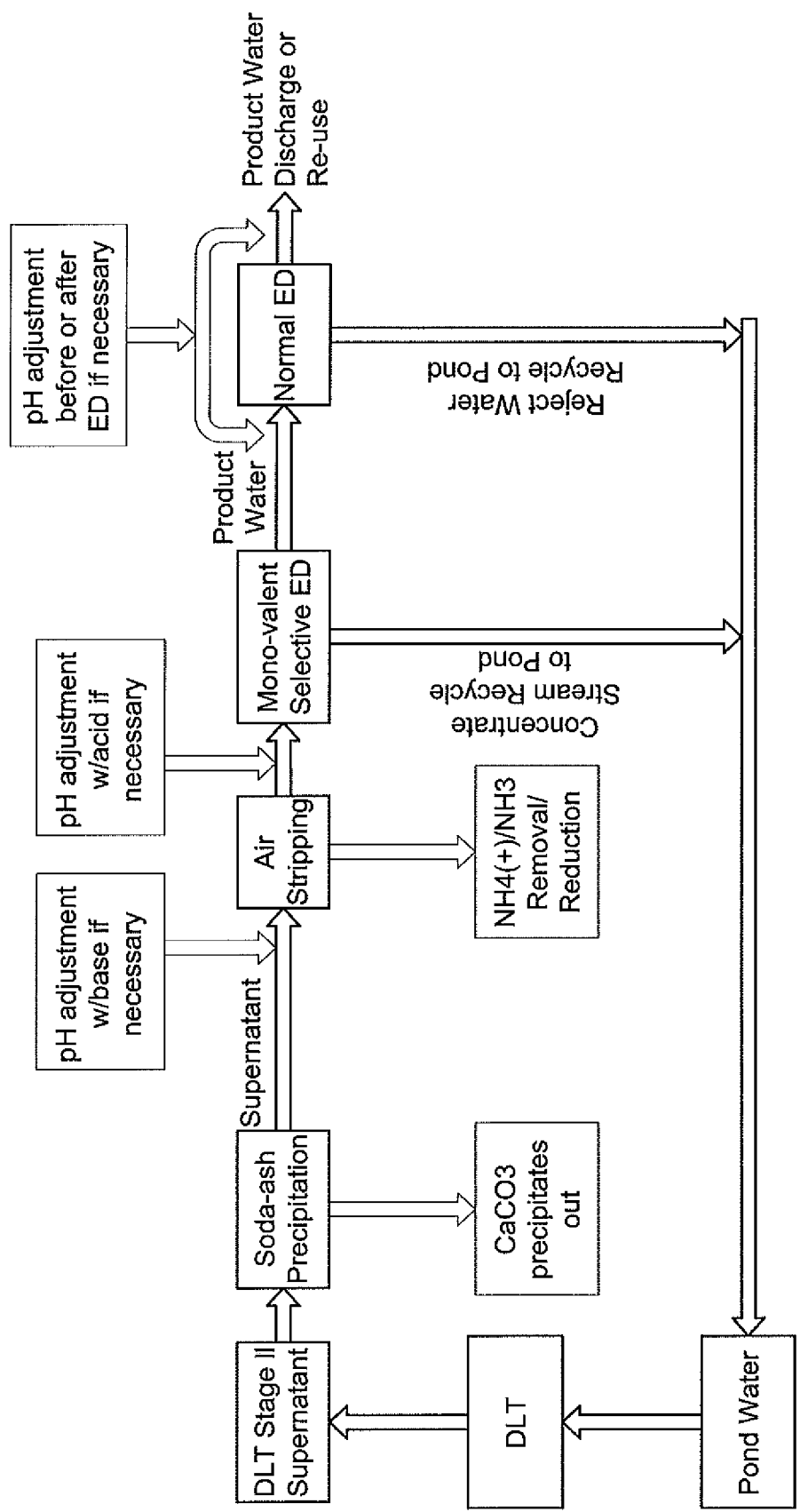

If the ammonia/ammonium concentration is substantially higher, e.g. greater than about 200 ppm, it may be beneficial to remove or reduce the ammonia/ammonium level at least partially before it is treated by monoselective ED processes. For example, an air-stripping unit operation or other effective technique known to those of skill in the art may be implemented as shown in FIG. 5.

Figure 6:
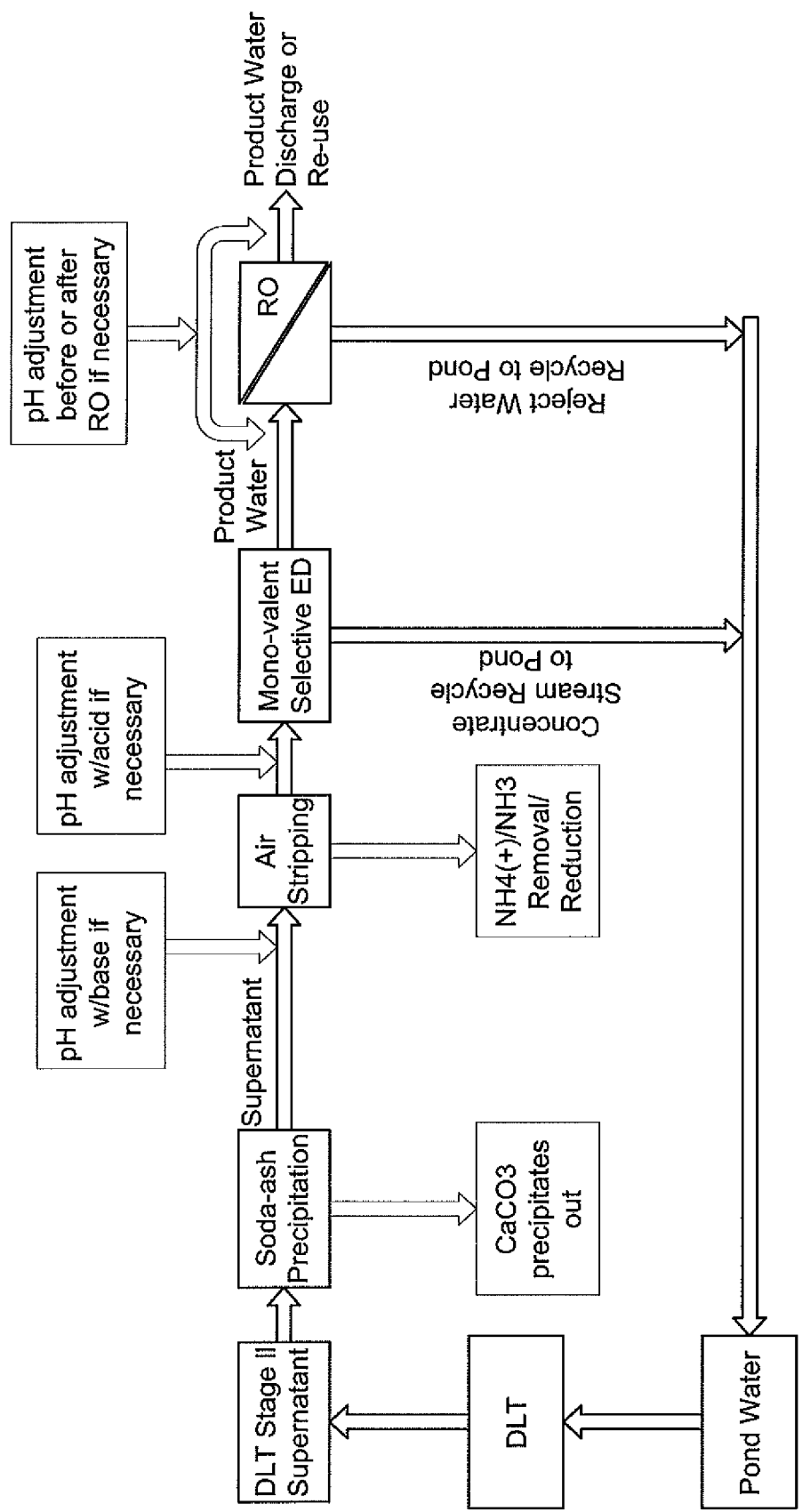

In accordance with one or more embodiments, the normal ED may be replaced with a pressure-driven membrane system, for example, nanofiltration (NF) or reverse osmosis (RO) as shown in FIG. 6. Pressure-driven membrane systems may be incorporated via a staged approach. In some non-limiting embodiments, the RO subsystem may be run at a recovery of up to about 80%, 85%, 90% or more. Air-stripping may or may not be necessary depending on the ammonia/ammonium level in the DLT stage II supernatant.

For example, it may be possible to bypass the air-stripping process and treat the DLT Stage-2 supernatant (shown in FIGS. 7 and 8) in circumstances where the ammonia/ammonium concentration is not too high, e.g. less than 200 ppm, less than 100 ppm, less than 50 ppm. The RO permeate may be polished, such as via IX, if the ammonia content does not meet discharge requirements.

Other combinations, configurations, and arrangements of unit operations in accordance with one or more embodiments may be readily apparent to those of ordinary skill in the art given the benefit of this disclosure.

In accordance with one or more embodiments, pH levels may be strategically controlled in connection with various unit operations to promote efficient operation. For example, a pH level may be adjusted upstream or downstream of one or more of an air stripping unit, an ED unit, a RO unit, or a polishing unit.

Notably, the processes depicted in FIG. 3 may be advantageous when silica content in the pretreated phosphogypsum wastewater (e.g. DLT Stage 2 effluent) is substantial. Silica will not move under electrical field and will not accumulate in the reject stream of ED. Therefore, the water recovery in ED processes will largely not be affected by the silica content unless it is saturated or supersaturated, indicating the processes of FIG. 3 may be able to achieve a higher water recovery than NF and/or RO processes.

In accordance with one or more embodiments, a treatment system may include at least one sensor configured to detect an operational parameter. For example, the sensor may be configured to detect an operational parameter associated with the source of pretreated supernatant and/or one or more unit operations. In some non-limiting embodiments, the sensor may be a flow rate, pH, temperature, conductivity, hardness, or concentration (e.g. ammonia concentration) sensor. In some embodiments, two or more sensors, e.g. a plurality of sensors, may be incorporated. The sensors may be strategically positioned throughout the system. The sensors may be interrelated and/or interconnected, for example, with respect to process control. The system may further include a controller in communication with the at least one sensor. The controller may be configured to provide a control signal in response to input from the sensors. For example, the controller may provide a control signal to actuate or adjust a valve of the system or subsystem thereof. In some non-limiting embodiments, the controller may be configured to adjust a flow rate or pH level in response to input from the sensors. In other non-limiting embodiments, the controller may strategically direct process streams to select unit operations based on input from various sensors. In this way, the controller can enable adjustment of one or more process parameters so as to produce one or more desirable product streams. The controller may be further configured to make a comparison between a measured value and a predetermined value, such as an established discharge requirement and to adjust various control settings accordingly.

The function and advantages of these and other embodiments can be better understood from the following examples. The examples are intended to be illustrative in nature and not considered to be limiting the scope of the invention.

Example 1

A process in accordance with FIG. 3 was modeled and preliminary results are presented in Table 3. The final effluent water quality after normal ED clearly meets the NPDES discharge standard. It was demonstrated that the methods and systems in accordance with one or more disclosed embodiments offers a viable alternative to the conventional technique of diluting DLT supernatant with RO water for environmental discharge.

TABLE 3

| Source of DLT Stage II supernatant: Two-Stage Lime Treatment in Practice | | | Mono-valent selective CEM ED | | Recovery: | Normal | Recovery: |
|---|---|---|---|---|---|---|---|
| DLT Stage II Supernatant | Concentration (ppm) | Recarbonation/ soda-ash (ppm) | Adjusted Feed (ppm) | Product | 85% Reject | ED Product | 85% Reject |
| Flow rate (GPM) | 1000 | 1000 | 1000 | 850 | 150 | 722.5 | 127.5 |
| pH | | 9 | 9 | 9 | | | |

TABLE 3-continued

| Source of DLT Stage II supernatant: Two-Stage Lime Treatment in Practice | | | Mono-valent selective CEM ED | | Recovery: 85% Reject | Normal ED Product | Recovery: 85% Reject |
|---|---|---|---|---|---|---|---|
| DLT Stage II Supernatant | Concentration (ppm) | Recarbonation/ soda-ash (ppm) | Adjusted Feed (ppm) | Product | | | |
| F | 20 | 20 | 20 | 3.53 | 113.3 | 0.62 | 20.00 |
| P | 13 | 13 | 13 | 2.29 | 73.7 | 0.40 | 13.00 |
| TSS | 15 | 15 | | | | | |
| Cl | 75 | 75 | 75 | 26.47 | 350.0 | 4.67 | 150.00 |
| SO4 | 2709 | 2709 | 2709 | 701.15 | 14086.8 | 123.73 | 3973.20 |
| Na | 900 | 900 | 1321 | 310.82 | 7045.3 | 54.85 | 1761.33 |
| Ca | 375 | 32 | 32 | 35.76 | 10.7 | 6.31 | 202.67 |
| Mg | 22 | 22 | 22 | 24.59 | 7.3 | 4.34 | 139.33 |
| Al | 0.2 | 0.2 | 0.2 | 0.05 | 1.1 | 0.01 | 0.27 |
| Cr | 0.1 | 0.1 | 0.1 | 0.11 | 0.0 | 0.02 | 0.63 |
| Zn | 0.1 | 0.1 | 0.1 | 0.11 | 0.0 | 0.02 | 0.63 |
| Fe | 0.1 | 0.1 | 0.1 | 0.11 | 0.0 | 0.02 | 0.63 |
| Mn | 0.03 | 0.03 | 0.03 | 0.03 | 0.0 | 0.01 | 0.19 |
| B | 0.5 | 0.5 | 0.5 | 0.12 | 2.7 | 0.02 | 0.67 |
| Lead | 0.1 | 0.1 | 0.1 | 0.02 | 0.5 | 0.00 | 0.13 |

Example 2

Figure 7:
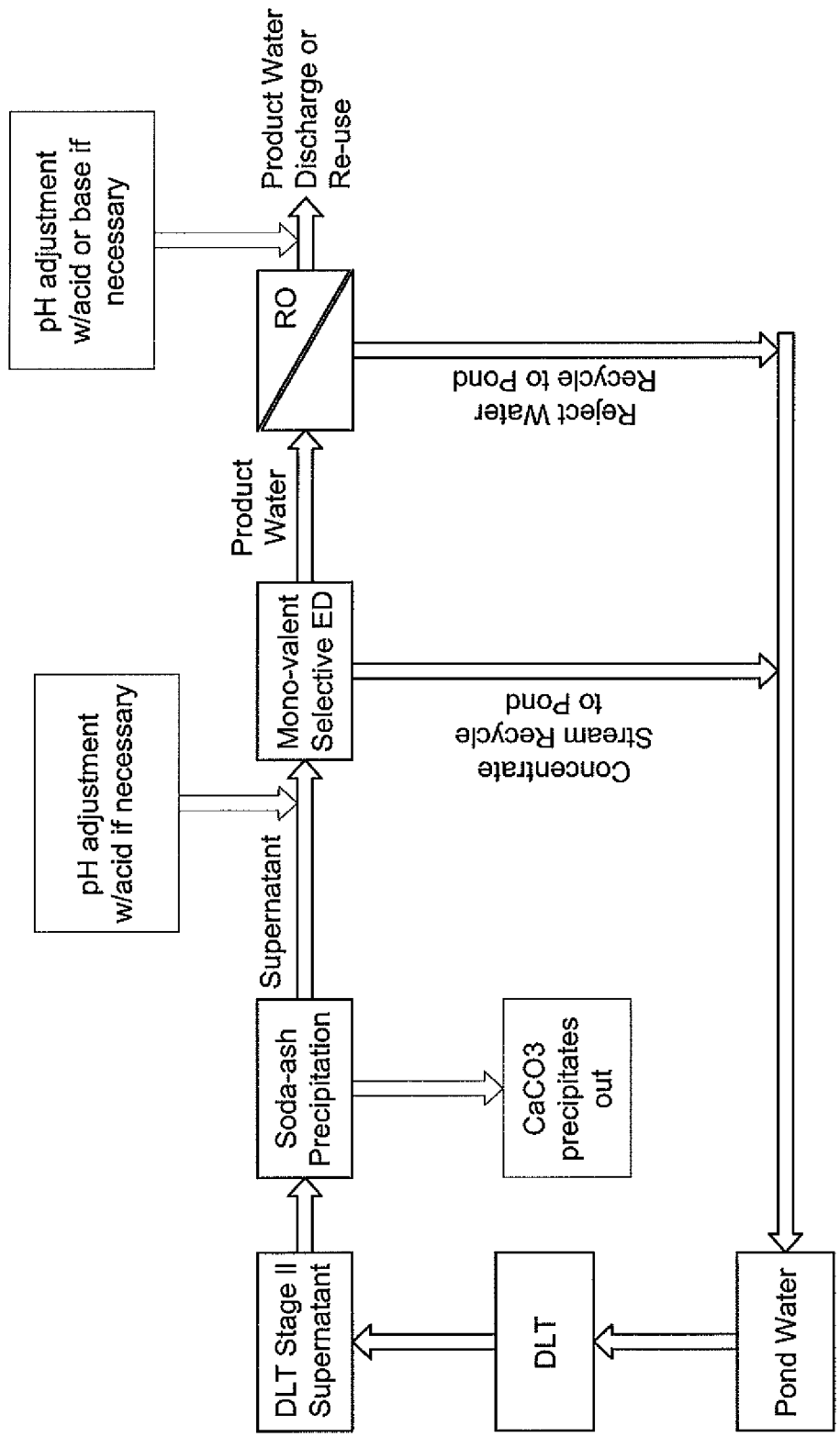
Figure 8:
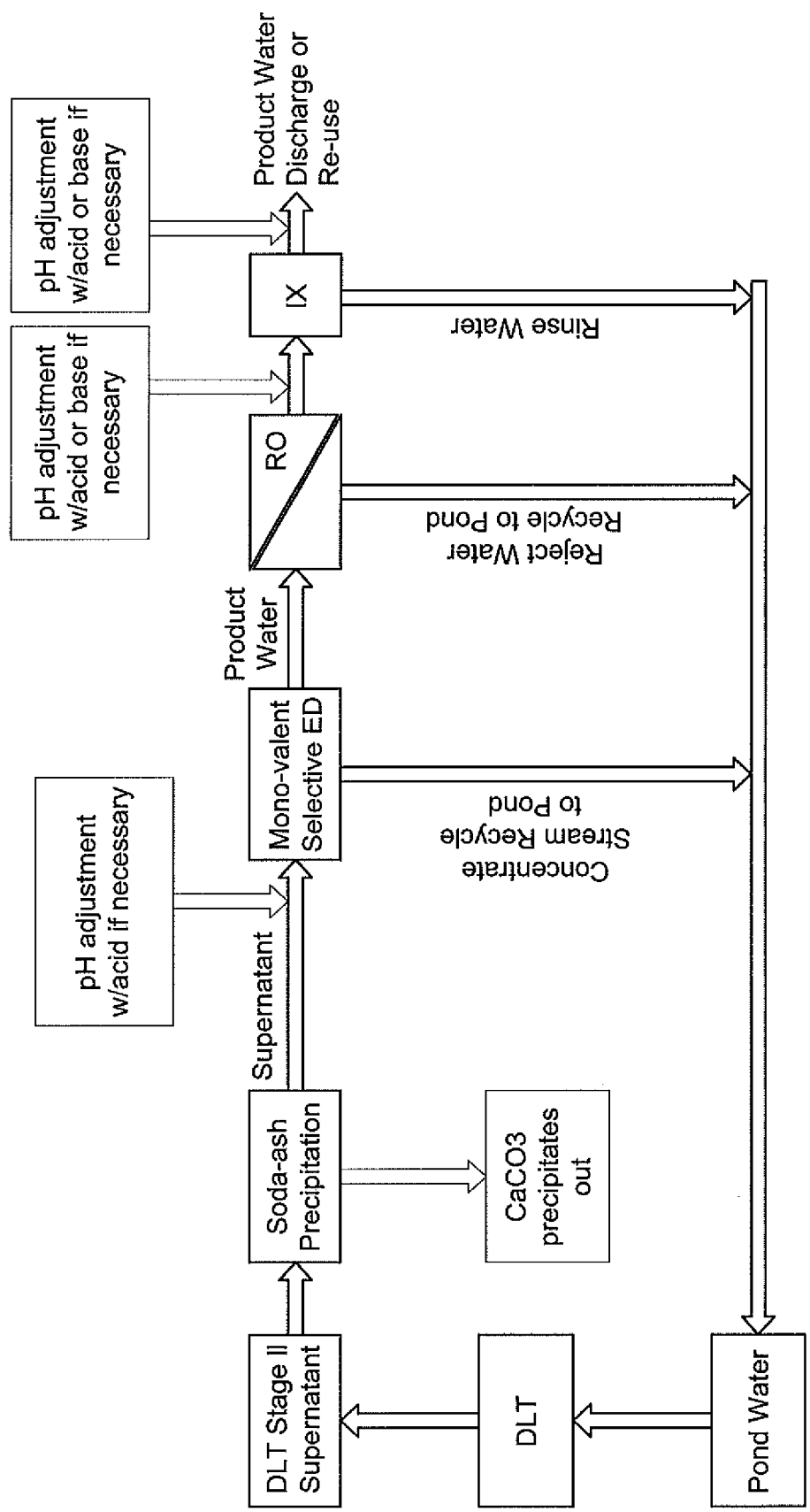

A process in accordance with FIG. 7 was modeled assuming 480 ppm ammonia/ammonium was present in the pretreated phosphogypsum wastewater. Preliminary results are presented in Table 4. The ammonia/ammonium in the RO permeate is too high to be discharged. This demonstrates the necessity of either a pretreatment in place to remove ammonia/ammonium upstream of the membrane processes or a post-treatment/polishing of the RO permeate (e.g. using IX).

TABLE 4 with NH3/NH4 present

| Source of DLT Stage II supernatant with modification: Two-Stage Lime Treatment in Practice | | | Mono-valent selective CEM ED | | | | Recovery: | |
|---|---|---|---|---|---|---|---|---|
| DLT Stage II supernatant | Concentration (ppm) | Recarbonation/ soda-ash (ppm) | Adjusted Feed (ppm) | Product | Recovery: 85% Reject | RO, 1P2S Product | 75% Concentrate Stage 1 | Concentrate Stage 2 |
| Flow rate (GPM) | 1000 | 1000 | 1000 | 850 | 150 | 637.5 | 212.5 | |
| pH | 9 | 9 | 9 | 9 | 9 | 6.5 | 9 | 9 |
| F | 20 | 20 | 20 | 3.53 | 113.3 | 0.23 | 0.28 | 22.23 |
| P | 13 | 13 | 13 | 2.29 | 73.7 | NA | NA | NA |
| TSS | 15 | 15 | | | | | | |
| Cl | 75 | 75 | 75 | 26.47 | 350.0 | 3.28 | 133.2 | 224.00 |
| SO4 | 2709 | 2709 | 2709 | 701.15 | 14086.8 | 41.47 | 3559 | 6073.90 |
| Na | 900 | 900 | 1321 | 310.82 | 7045.3 | 5.39 | 689 | 1225.00 |
| Ca | 375 | 32 | 32 | 35.78 | 10.7 | 0.31 | 80 | 143.00 |
| Mg | 22 | 22 | 22 | 24.59 | 7.3 | 0.22 | 55.6 | 88.29 |
| NH3/NH4 | 480 | 480 | 480 | 262.35 | 1600.00 | 12.50 | 1102 | 1882.00 |
| Al | 0.2 | 0.2 | 0.2 | 0.05 | 1.1 | | | |
| Cr | 0.1 | 0.1 | 0.1 | 0.11 | 0.0 | | | |
| Zn | 0.1 | 0.1 | 0.1 | 0.11 | 0.0 | | | |
| Fe | 0.1 | 0.1 | 0.1 | 0.11 | 0.0 | | | |
| Mn | 0.03 | 0.03 | 0.03 | 0.03 | 0.0 | | | |
| B | 0.5 | 0.5 | 0.5 | 0.12 | 2.7 | | | |
| Lead | 0.1 | 0.1 | 0.1 | 0.02 | 0.5 | | | |

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations 10 described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of treating a phosphogypsum-containing water, comprising:
    removing ammonia from the phosphogypsum-containing water to form a pretreated supernatant;
    subjecting the pretreated supernatant to asymmetric electrodialysis (ED) in a first unit operation comprising an alternating series of monovalent cation selective membranes and anion selective membranes to produce a treated water meeting at least one predetermined discharge requirement;
    subjecting the treated water to further electrodialysis (ED) in a second unit operation comprising an alternating series of non-monovalent cation selective membranes and anion selective membranes to produce a product water;
    recycling a first reject stream from the first unit operation and a second reject stream from the second unit operation to the phosphogypsum-containing water; and
    discharging the product water.

2. The method of claim 1, further comprising polishing the product water prior to discharge.

3. The method of claim 2, wherein polishing involves ion exchange (IX) treatment.

4. The method of claim 1, wherein the pretreated supernatant is subjected to air-stripping prior to the first unit operation.

5. The method of claim 1, further comprising reducing a level of hardness in the pretreated supernatant prior to the first unit operation.

6. The method of claim 5, wherein the pretreated supernatant is subjected to precipitation prior to the first unit operation.

7. The method of claim 1, wherein the at least one predetermined discharge requirement pertains to a conductivity limit or a level of ammonia, fluoride, or phosphorous.

8. The method of claim 1, wherein the pretreated supernatant is sourced from a double lime treatment (DLT) operation.

9. The method of claim 1, further comprising returning at least one reject stream to a source of the phosphogypsum-containing water.

10. The method of claim 1, further comprising measuring an ammonia concentration of the pretreated supernatant.

11. The method of claim 1, further comprising measuring a pH level of the pretreated supernatant.

* * * * *